D. HOATS.
Corn Sheller.
No. 7,036. Patented Jan'y 22, 1850.
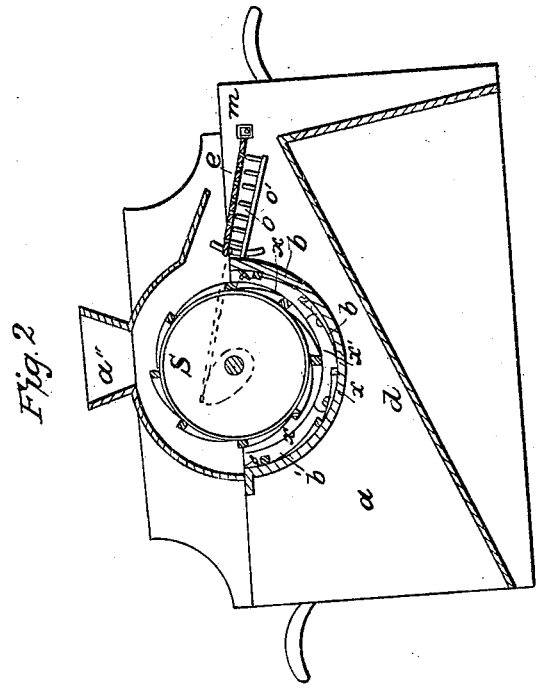
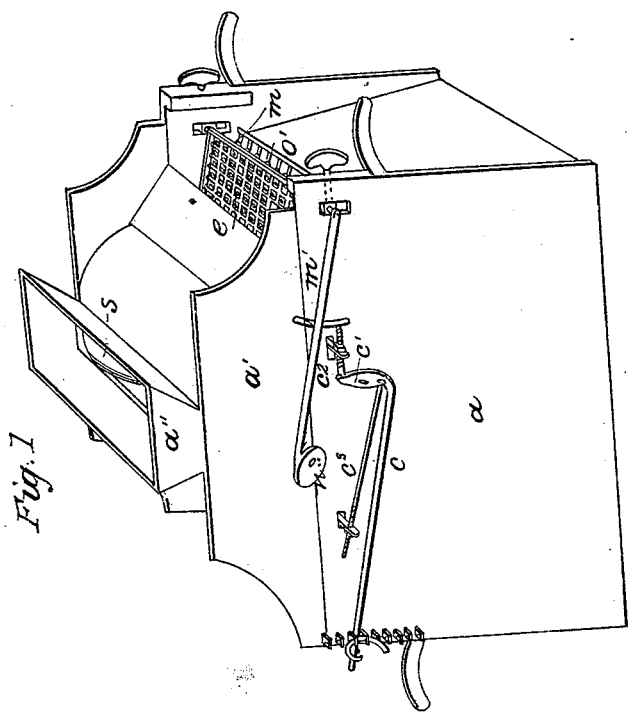

UNITED STATES PATENT OFFICE.

DANIEL HOATS, OF MILTON, PENNSYLVANIA.

CONCAVE OF CORN-SHELLERS.

Specification of Letters Patent No. 7,036, dated January 22, 1850.

*To all whom it may concern:*

Be it known that I, D. HOATS, of Milton, in the county of Northumberland and State of Pennsylvania, have invented certain new and useful Improvements in Corn-Shellers, of which the following is a full, clear, and exact description, reference being had to the annexed drawing of the same, making part of this specification, in which—

Figure 1 is a perspective view, and Fig. 2 a vertical longitudinal section.

My invention and improvement consists; first in making the concave in segments hinged together and separately adjustable to different distances from the cylinder, to adapt the machine to the shelling of different kinds of corn—second in so connecting the staves of both sides of the concave that when adjusted they shall be simultaneously moved an equal distance toward or from the cylinder while at the same time their relative distance therefrom shall remain unchanged; and third—in combining with the grate or coarse screen for separating the grains of corn from the cobs, a series of punches or teeth, which when the grate which has a vertical oscillation descends will protrude through its meshes and free them from pieces of cobs and other obstructions, this arrangement insures a constant and effectual separation of the corn and cobs.

This machine is of the kind called a "cylinder corn sheller" and strips the corn from the cobs by passing the ears between a toothed cylinder and concave, most of the corn passing through the concave, which is grated, and down an apron to the front of the machine, while the cobs are discharged upon a grate or sieve where they are separated from any scattering corn that may remain among them, and discharged at the rear end of the machine. The grain passing through the grate falls upon the upper end of the same apron which receives the corn from the concave, with which it is mixed and passed out from the front of the machine. The cobs being somewhat broken while being stripped of their corn, the pieces have a tendency to lodge in and obstruct the meshes of the grate, to obviate this difficulty a series of punches are arranged underneath the grate which when it descends, in its oscillation, protrude through the meshes and push out any obstructions that may be lodged in them, and at the same time agitate the overlying corn and cobs thus facilitating their separation and discharge.

In the accompanying drawings, the frame of the machine represented as being made in two parts the lower ($a$) supporting the concave, cylinder, screen, and punches, while the upper ($a'$) supports the hopper ($a''$) and forms a cover for the cylinder. The concave is made of three staves ($b$ $b'$ $b^2$), hinged together the lowermost ($b$) of which is secured to the sides of the frame by means of screw bolts ($x'$) passing through slots in a flange ($x$) attached to its end, the slot in the flange admits of the stave being moved toward or from the cylinder a sufficient distance to adapt it to shelling corn of the smallest or largest size. The outside staves ($b'$ $b^2$) are hinged at ($z$) to the middle stave ($b$) and may be adjusted in the same manner and the concave may be composed of but two staves, or it may, if it should be expedient be made of a larger number.

The device shown in the drawings for adjusting the outside staves of the concave is composed of a bent lever ($c$) whose short arm turns on a pivot ($c'$) and whose long arm is engaged in a notched rack at the front of the machine to hold it in any required position. At equal distances from the fulcrum of the short arm of the lever $c$ rods $c^2$ $c^3$ are jointed which are connected with the upper part of the opposite sides of the concave by a screw and nut by which the concave can be adjusted on both sides at any required distance from the cylinder, to admit the ears and discharge the cobs, and when the concave is opened or closed by raising or lowering the long arm of the lever, the relative distances of the two sides of the concave from the cylinder will remain unchanged. This arrangement is of great advantage; for when the cobs are large and the grain small, the opening at the side of the concave at which the cobs are discharged must be nearly as large as that at which the ears are admitted; but when the cobs are small and the grain large then the opening at the discharge side of the concave must be much narrower than that at the opposite side at which the corn is admitted.

The apron ($d$) must extend beneath the concave to the rear end of the grate so as to convey all the corn to the front of the machine. The grate ($e$) may be made of cast iron, of coarse wire-web-screen, or other material as may be most convenient, the meshes must be large and they can be kept clean and the corn and cobs overlying them agitated by means of a series of punches (o) supported in an upright position by bars (o') in which they are set, which are secured to the sides of the frame. The grate is suspended at its rear end upon a shaft (m) which extends across the frame; from this shaft an arm (m') extends backward and rests upon a cam (n) on the cylinder shaft which in revolving communicates to it a vertical oscillating motion which it transmits to the sieve; when the grate descends its meshes pass over the punches which protrude through above its surface, but when the grate is raised the punches are left beneath it, by this operation the meshes are kept free from obstructions and the corn and cobs prevented from lodging on the grate.

The cylinder (s) is made in the usual or any suitable manner, and its surface provided with spiral ribs, corresponding in form with similar ribs placed at suitable distances apart on the face of the concave, the ribs of the concave and those of the cylinder are wound around the axis of the cylinder in opposite directions so that they shall move obliquely over each other in the manner of the cutting edges of the revolving shears. This arrangement of the ribs causes them to strip the corn from the cobs with great facility and rapidity. The screen and punches may both be made to move without any change in the principle of the operation.

The several parts of the apparatus may be made of any material that may be deemed most suitable or convenient for the purpose.

What I claim as my invention and desire to secure by Letters Patent is—

1. I claim connecting the opposite sides of the concave substantially as herein described, whereby they may be moved simultaneously toward or from the cylinder without changing their relative distances from the same.

2. I claim the combination of the screen or grate with the punches for freeing its meshes from obstructions substantially as described.

In testimony whereof I have hereto signed my name this 13th October 1849.

D. HOATS

Witnesses:
 P. H. WATSON,
 SIMEON EMERSON.